Sept. 21, 1965      C. H. COWLEY      3,207,589
METHOD AND APPARATUS FOR PRODUCING ALL-GLASS
MULTIPLE SHEET GLAZING UNITS
Filed March 3, 1960      2 Sheets-Sheet 1
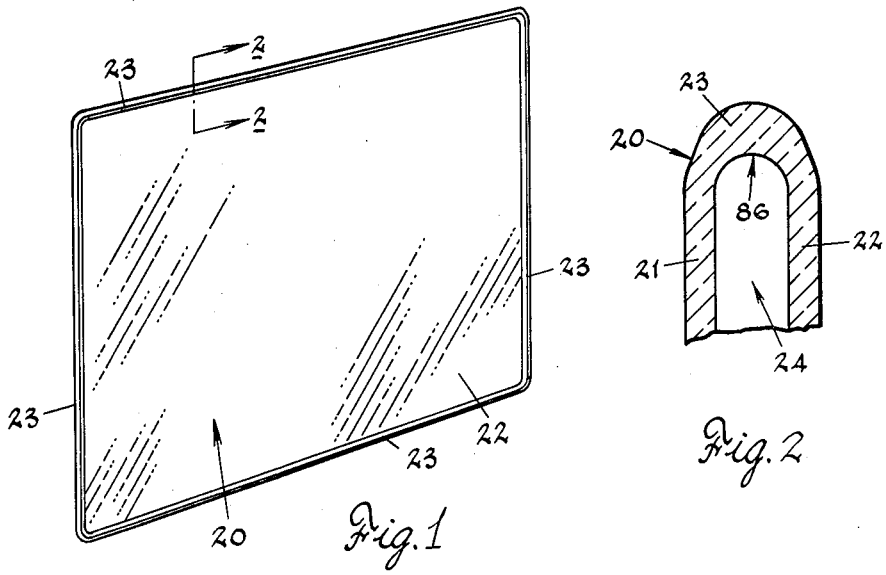
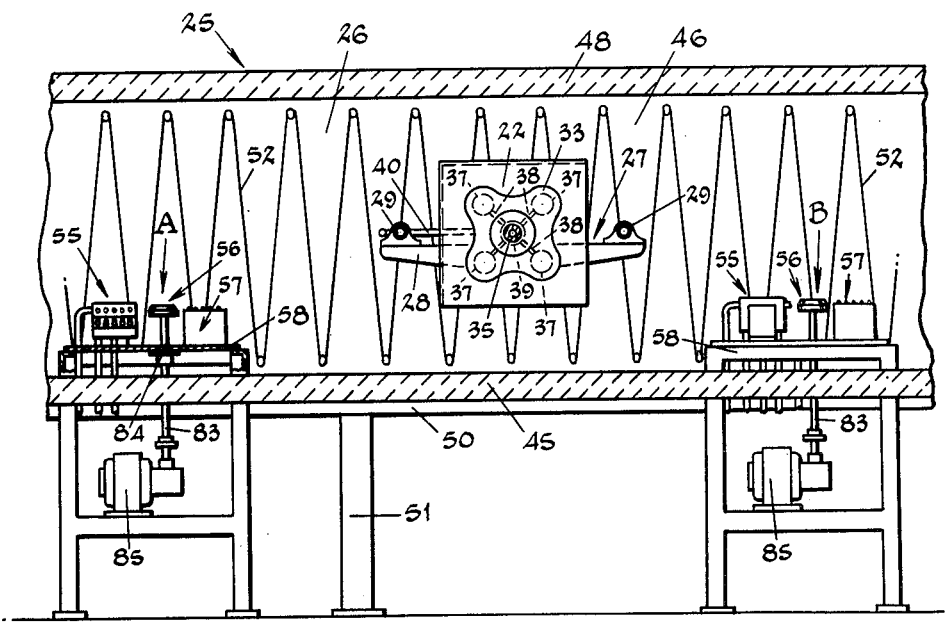
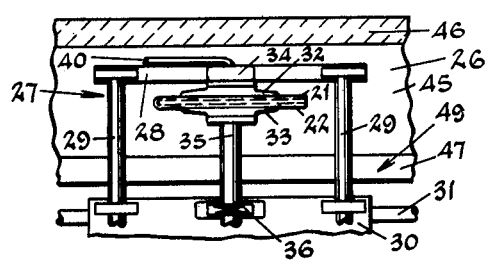
INVENTOR.
Charles H. Cowley
BY
Nobbe & Swope
ATTORNEYS INVENTOR.
Charles H. Cowley
BY
Nobbe & Swope
ATTORNEYS

United States Patent Office 3,207,589
Patented Sept. 21, 1965

3,207,589
METHOD AND APPARATUS FOR PRODUCING ALL - GLASS MULTIPLE SHEET GLAZING UNITS
Charles H. Cowley, Toledo, Ohio, assignor to Libbey-Owens-Ford Glass Company, Toledo, Ohio, a corporation of Ohio
Filed Mar. 3, 1960, Ser. No. 12,550
6 Claims. (Cl. 65—58)

The present invention relates broadly to the production of all-glass multiple sheet glazing units composed of two sheets of glass sealed together in spaced face-to-face relation entirely around the edges thereof to provide a dead air space therebetween.

More particularly, this invention is concerned with an improved method and apparatus for heating the marginal edge portions of the spaced sheets of glass to a temperature at which they can be fused to one another to form an edge wall.

It has been found that when forming the edge wall of such a unit under the application of heat and pressure to the marginal edge portions of the spaced glass sheets, it is important that the inner surfaces of the fused edges of the sheets be in the form of a rounded, substantially semi-circular fillet. If this is not done and a crevice is permitted to form along the inner line of fusion of the sheet edges, there is created a point of weakness which has been found to be a frequent source of breakage in such units. Heretofore, it was customary to direct heat upon the marginal edge portions of the glass sheets solely from the outside and after the temperature thereof was raised to a point at which the glass was pliable, a pressing force was applied to the outer surfaces of the heated marginal edge portions to urge them toward and into fusion contact with one another. However, due to the relatively high heat insulation properties of glass, a considerable temperature differential was found to be established between the outer and inner surfaces of the marginal edge portions of the glass sheets heated in this manner. This temperature differential provided a fused edge wall which was not only found to have a relatively large stress concentration but which, due to the cooler condition of inner surfaces of the sheet margins, showed a tendency to develop a crevice along the line of fusion of the sheet edges.

According to this invention, there is provided an improved method and apparatus for heating the marginal edge portions of the spaced glass sheets in such a manner as to provide fused edge walls of increased strength and resistance to breakage.

Another object of the invention is to provide an improved method and apparatus for substantially uniformly heating the inner and outer surfaces of the marginal edge portions of the glass sheets to be fused to one another in order to obtain a fused edge wall having a substantially uniform semi-circular inner fillet.

Another object of the invention is to provide novel apparatus of the above character embodying improved heating means adapted to simultaneously heat the inner and outer surfaces of the marginal edge portions of the glass sheets to bring said surfaces to a substantially uniform temperature just prior to the fusing of said edge portions together.

Other objects and advantages of the invention will become more apparent during the course of the following description which taken in connection with the accompanying drawings.

In the drawings, wherein like numerals are employed to designate like parts throughout the same:

FIG. 1 is a perspective view of an all-glass multiple sheet glazing unit of the type with which this invention is concerned;

FIG. 2 is a sectional view taken along line 2—2 of FIG. 1;

FIG. 3 is a fragmentary vertical longitudinal sectional view of an apparatus provided by the present invention for producing the all-glass multiple sheet glazing units;

FIG. 4 is a fragmentary plan view of the apparatus of FIG. 3;

Figure 5:
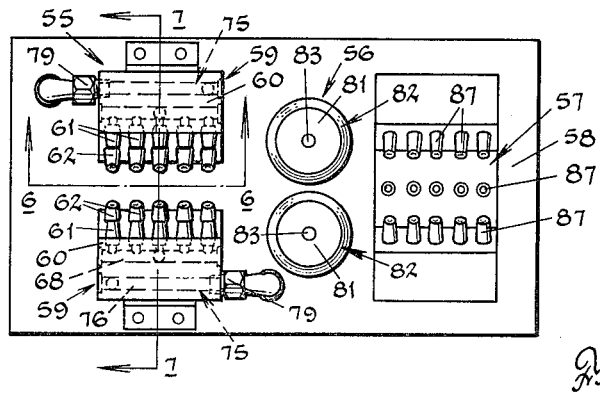
FIG. 5 is a plan view of one of the sealing stations of the apparatus.

With reference now to the drawings, there is shown in FIGS. 1 and 2, an all-glass multiple sheet glazing unit 20 which comprises two spaced sheets of glass 21 and 22 having the edge portions thereof fused to one another to provide edge walls 23 which create a sealed, dead air space 24 therebetween.

In FIG. 3 is illustrated one form of apparatus generally designated by the numeral 25, for producing the all-glass multiple sheet glazing unit 20. The apparatus 25 generally comprises a horizontal chamber or furnace 26 and a support means 27 for carrying the glass sheets 21 and 22, to be fused together around their edge portions, through the furnace. Arranged within the furnace 26 are a plurality of spaced sealing areas, such as are designated by the letters A and B, through which the glass sheets 21 and 22 are passed and in which the edge portions thereof are fused to one another. In the production of all-glass multiple sheet glazing units according to the process disclosed herein, the two sheets of glass are passed through a sealing station, as at A, to form one edge wall and are then rotated to locate the edge portions of another side of the glass sheets in position to be sealed together, as in sealing station B. Thus, in FIG. 3, the sheets 21 and 22 are indicated as having been sealed together along the top and left hand edge and with the bottom edge positioned for the next sealing operation.

The support means 27 includes a beam 28 extending longitudinally within the furnace and mounted by transverse bars 29 on a carriage 30 that is supported on and caused to traverse a rail structure generally indicated at 31 in FIG. 4 and which is mounted exteriorly of the furnace.

Mounted on the carriage 30 are a pair of vacuum platens 32 and 33, one for each sheet of glass, and which support the sheets in substantially vertical, spaced parallel relation with respect to one another while they are moved through the furnace and the edge portions thereof fused to one another. More specifically, the platen 32 is mounted by a bracket 34 on the beam 28 while the platen 33 is carried by a tubular bar 35 that is mounted on the carriage 30 by a bracket 36. The tubular bar 35 is adapted to be turned during forward movement of the carriage 30 and between the sealing stations to progressively rotate the glass sheets so that a succeeding pair of spaced edge portions will be brought in position to be sealed together.

The opposed surfaces of the platens 32 and 33 are each provided with suitably formed recesses 37 through which reduced air pressure or a vacuum can be applied to the glass sheets to support them against the platens. Communicating grooves 38 are formed in the surfaces of the platens to connect the recesses 37 with centrally formed bores 39 which, in one instance, connect with a suitable source of vacuum through a tube 40 and, in the other instance, through the hollow bar 35.

The furnace 26 (FIGS. 3 and 4) comprises a bottom wall 45, side walls 46 and 47 and a roof or top wall 48; the side wall 47 being provided with a horizontally disposed slot 49 through the bars 29 and 35 project from the externally mounted carriage 30. The several walls of the furnace are all constructed of fire-brick or other suitable refractory material. The bottom wall 45 is supported by longitudinally extending beams 50 carried by vertically disposed support legs 51. The furnace is shown, by way of example, as being electrically heated by wire filaments 52 located along the inner surfaces of the side walls 46 and 47. However, gas burners, or any other well known type of heating technique, may be employed.

At each of the sealing areas A and B, there is provided a sealing means which includes (FIGS. 3 and 5) a fusion burner assembly 55, an edge forming and shaping tool 56 and a polishing burner assembly 57, all mounted on a suitable frame 58.

As herein provided, the novel fusion burner assembly 55 for heating the marginal edge portions of the glass sheets 21 and 22 includes a pair of spaced burner heads 59 mounted on the frame 58 and disposed one at each side of the path of travel of the glass sheets. Each of the burner heads 59 comprises a body portion 60 having a plurality of burner tips 61 and 62.

Figure 6:
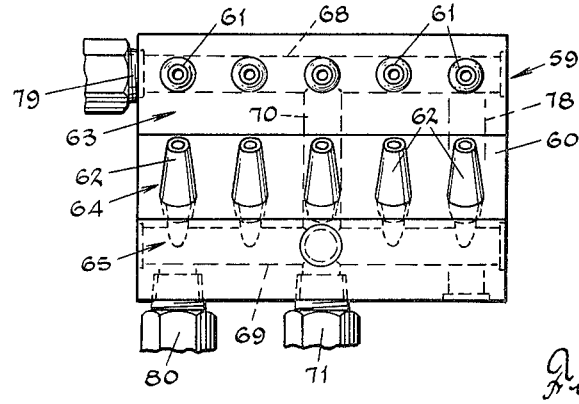
FIG. 6 is a view taken along line 6—6 in FIG. 5.

As shown in FIG. 6, the burners 61 of each burner head 59 are arranged in a horizontally disposed row and positioned to direct heating flames in a substantially horizontal direction against the outer surface of the lower marginal edge portions of the adjacent glass sheet 21 or 22 as the sheets are moved through the sealing area. On the other hand, the burner tips 62 are arranged to direct heating flames upwardly and angularly inwardly so as to transversely impinge upon the inner surface of the lower marginal edge portions of the glass sheet remote from the furnaces. Thus, as the pair of glass sheets 21 and 22 move between the burner heads 59, the rows of burner tips 61 will heat the outer surface a of the glass glass sheet adjacent thereto while the rows of burner tips 62 will simultaneously heat the inner surface b of the more remote sheet as indicated in broken lines in FIG. 7 thereby bringing the outer and inner surfaces of the marginal edge portions of the glass sheets to substantially the same uniform temperature. The angled burners 62 are so positioned that the flames therefrom will also heat the peripheral edges of the glass sheets.

Figure 7:
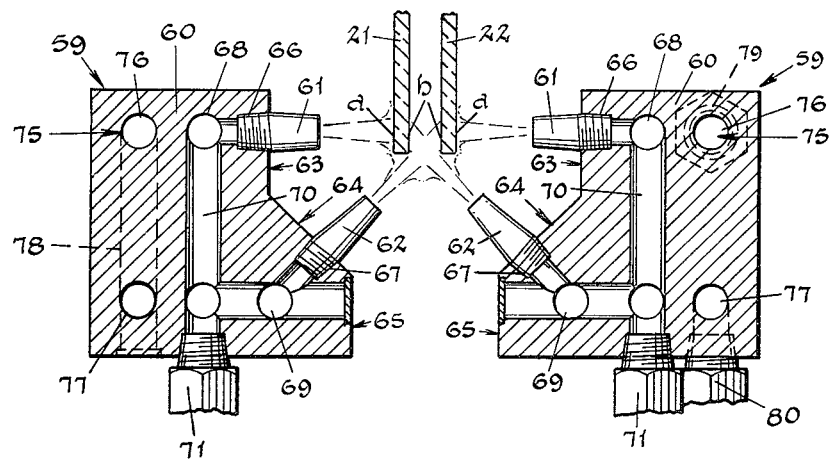
FIG. 7 is a transverse sectional view taken along line 7—7 of FIG. 5 showing the heating of a pair of glass sheets according to the method of the invention.

To locate the burner tips 61 and 62 in this relation, the body portion 60 of each burner head 59 is, as shown in FIG. 7, formed at its inwardly directed surface with a vertically disposed wall 63 and an outwardly sloping wall 64; the wall 64 merging at its lower edge into a vertically disposed lower wall 65. As viewed in FIG. 6, the burner tips 61 are received in parallel relation to one another in threaded openings 66 provided in the vertical wall 63 while the tips 62 are similarly positioned and received in threaded openings 67 in the angularly disposed wall 64. Through the openings 66, the tips 61 connect to a passage 68, extending longitudinally in the upper portion of the burner head while the openings 67 open into a passage 69, parallel to and formed in the head beneath the passage 68. By means of a vertical and centrally disposed passage 70, the passages 68 and 69 are connected in common to a source of combustible fuel supply at the pipe fitting 71.

Between the passages 68 and 69 and the opposite or rear wall surface of each burner head 59, is a substantially U-shaped passage 75 which is provided to carry a coolant, such as water, through the head and thereby reduce the temperature of the burner head and prevent the burner tips from overheating. The passage 75 is formed by passages 76 and 77 extending parallel to the supply passages 68 and 69, and a vertical passage 78 interconnecting the passages 76 and 77 adjacent one end of the burner head 59. The supply of coolant is directed through a pipe fitting 79 connected to the opposite end of passage 76, therethrough to the passage 78 and through the passage 77 to the opposite end thereof which communicates with a pipe fitting 80.

As the marginal edge portions of the glass sheets 21 and 22 are passed between the burner tips 61 and 62 of the spaced burner heads 59, said edge portions are heated to substantially uniform temperature and more especially the inner and outer surfaces of the edge portions are brought to a heated condition such that the inner surfaces of the edge portions of the spaced sheets can be fused one to the other.

The heated edge portions of the glass sheets are then moved into engagement with the edge forming tool 56 which, as herein shown, comprises a pair of shaping rollers 81 having peripheral surfaces provided with upwardly inclined surfaces 82 to suitably form the edge wall 23 as the sheets are carried through the restricted pass therebetween. Each roller 81 is mounted on a vertically disposed shaft 83, (FIG. 3), with each shaft being provided with a gear 84 in order that a driving means, such as the motor 85, upon turning one of the shafts 83 will drive both shafts at the same rate of speed. The rate of rotation of the forming rollers 81, in opposed directions, is of course in proportion to the rate of movement of the glass sheets so that as the heated edges thereof are received in the pass between the rollers, the surfaces 82 will urge said edge portions toward and into fusion contact with one another thereby providing the glass sheets with a sealed edge wall 23 having a rounded, semi-circular internal fillet 86 (FIG. 2) with no interval crevice or perceptible line of demarcation between the edges of the glass sheets on either the interior or exterior surfaces of the edge wall.

As a final step in each sealing operation, the sealed edge wall 23 upon emerging from between the forming rollers 81 is passed directly over the flames from the burner tips 87 of the polishing burner assembly 57. As viewed in FIG. 5, the burner tips 87 are arranged in spaced rows to direct their flames angularly against the outer surfaces of the edge wall as well as perpendicularly thereagainst. This finishing action serves to smooth out and remove any surface irregularities in the edge wall and also works the edge wall to improve its strength.

Although the means for heating the edges of the glass sheets prior to pressing them into fusion contact with one another have been specifically disclosed herein as flame burners it is considered within the spirit of the invention to use radiant burners, electric resistance heating means, or any other suitable heating means which will derect substantially equal amounts of heat onto both the internal and external surfaces of the marginal edge portions of the sheets in accordance with the invention.

It is to be understood that the form of the invention herewith shown and described is to be taken as an illustrative embodiment only of the same, and that various changes in the shape, size and arrangement of parts, as well as various procedural changes may be resorted to without departing from the spirit of the invention.

I claim:

1. Method of producing all-glass multiple sheet glazing units in which two sheets of glass are supported in fixed spaced face-to-face relation in a vertical position and conveyed along a definite path, said method comprising directing heat onto the outer surfaces of the marginal edge portions of the glass sheets as said sheets are moved along said path, simultaneously directing additional heat between the sheets from the outside to impinge on the inner surfaces of said marginal edge portions, and urging the heated marginal edge portions of the sheets into fusion contact with one another as said sheets move along said path.

2. A method of producing all-glass multiple sheet glazing units as claimed in claim 1, in which the heating of the inner surfaces of the marginal edge portions of the glass sheets is effected by directing flames between the sheets to impinge against said inner surfaces at an angle other than a right angle with respect thereto.

3. A method of producing all-glass multiple sheet glazing units in which two sheets of glass are supported in fixed spaced face-to-face relation in a vertical position and conveyed along a definite path between a pair of heat sources, said method comprising the steps of directing heating flames from each of said heat sources onto the outer surface of the marginal edge portions of the adjacent sheet as said sheet is moved along said path, simultaneously directing heating flames from each of said heat sources across said path to impinge on the inner surface of the marginal edge portions of the glass sheet remote from said heat source, and progressively urging the heated marginal edge portions of the sheet into fusion contact with one another as said sheets are moved along said path.

4. In apparatus for producing all-glass multiple sheet glazing units, supporting and conveying means adapted to support two sheets of glass in spaced face-to-face relation in a vertical position and to convey them along a definite path through a heating chamber, heating means located along the path of movement of the glass sheets, one on each side of said path, and each adapted to direct heat across said path to impinge upon the outer surface of the marginal edge portions of the adjacent glass sheet and also upon the inner surface of the marginal edge portions of the glass sheet remote therefrom as the sheets move along said path, and means located further along said path downstream from said heating means for urging the heated marginal edge portions of the sheets into fusion contact with one another also during movement of said sheets along said path.

5. In apparatus for producing all-glass multiple sheet glazing units, supporting and conveying means adapted to support two sheets of glass in spaced face-to-face relation in a vertical position and to convey them along a definite path through a heating chamber, a pair of burner assemblies located along said path, one on each side of said path, each of said burner assemblies including means for directing heating flames across said path to impinge upon the outer surface of the marginal edge portions of the adjacent glass sheet in a direction normal thereto and also upon the inner surface of the marginal edge portions of the glass sheet remote therefrom and in an angular direction relative thereto as the sheets are advanced through said heating chamber by said supporting and conveying means, and means disposed adjacent said path downstream from said pair of burner assemblies and operable to engage the heated edge portions of the sheets and to urge them into fusion contact with one another also during movement of said sheets along said path.

6. In apparatus for producing all-glass multiple sheet glazing units, a heating chamber, supporting and conveying means adapted to support two sheets of glass in spaced face-to-face relation in a vertical position and to convey them along a definite path through said heating chamber, a pair of heating assembles disposed within said chamber located along said path, one on each side of said path and adapted to direct heating flames across said path, each of said heating assemblies including a body portion, a plurality of horizontally disposed burners carried by said body portion and positioned to impinge heating flames upon the outer surface of the bottom marginal edge portions of the adjacent glass sheet and a plurality of angularly disposed burners positioned to direct heating flames upwardly between the glass sheets to impinge upon the inner surface of the bottom marginal edge portions of the sheet remote therefrom as the sheets move along said path, said body portion being provided with passages through which a combustible fuel can be supplied to the burners, and means disposed adjacent said path downstream from said pair of heating assemblies for urging the heated marginal edge portions of the sheets into fusion contact with one another also during movement of said sheets along said path.

References Cited by the Examiner

UNITED STATES PATENTS

| 2,145,351 | 1/39 | Hazelton | 65—2 |
| 2,478,812 | 8/49 | Drake | 65—156 |
| 2,695,477 | 10/54 | Van Steenis | 65—5 X |
| 2,954,644 | 10/60 | Montgomery | 49—7 |
| 2,968,891 | 1/61 | Dean | 65—152 |
| 3,086,375 | 4/63 | Mainz | 65—58 |

FOREIGN PATENTS 206,177  2/57  Australia.

DONALL H. SYLVESTER, *Primary Examiner.*

IVAN R. LADY, MORRIS O. WOLK, *Examiners.*